Figure 1:
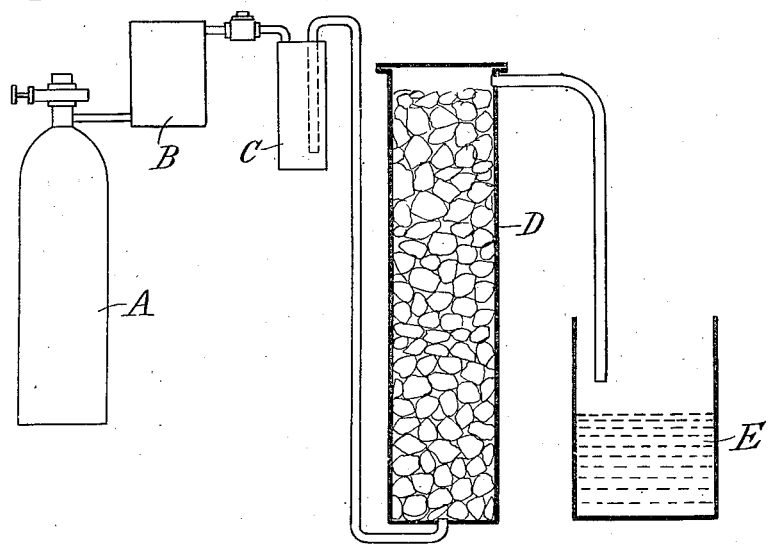

J. C. BAKER.
METHOD OF STERILIZING WATER AND SEWAGE.
APPLICATION FILED MAR. 18, 1921.

1,413,153.

Patented Apr. 18, 1922.

Inventor
John Clark Baker
By his Attorneys
Kerr, Page, Cooper & Hayward

UNITED STATES PATENT OFFICE.

JOHN CLARK BAKER, OF RIDGEFIELD PARK, NEW JERSEY, ASSIGNOR TO WALLACE & TIERNAN CO. INC., OF BELLEVILLE, NEW JERSEY, A CORPORATION OF NEW YORK.

METHOD OF STERILIZING WATER AND SEWAGE.

1,413,153. Specification of Letters Patent. Patented Apr. 18, 1922.

Application filed March 18, 1921. Serial No. 453,497.

*To all whom it may concern:*

Be it known that I, JOHN CLARK BAKER, a citizen of the United States, residing at Ridgefield Park, county of Bergen, and State of New Jersey, have invented certain new and useful Improvements in Methods of Sterilizing Water and Sewage, of which the following is a full, clear, and exact description.

The invention which is the subject of this application for Letters Patent is a novel and improved method or process for the sterilization of water whether portable or not, sewage and the like, particularly when carried out on an extended scale as for municipal water plants, sewage disposal plants and similar enterprises.

The treatment of water or sewage for purposes of sterilization as heretofore carried out has almost invariably involved the use of chlorine gas or chlorine water, but the use of this agent is attended by serious objections and disadvantages chief among which is the tendency of the gas when moist or in water to corrode the apparatus used for carrying out the process whether such apparatus be used for metering or applying the chlorine and this is especially true with respect to the apparatus used to pump the disinfecting solution into the water supply. In many cases also the applied chlorine has a deleterious corrosive action not only on the pumps but on the conducting pipes of the system.

This latter objection has been obviated in a measure heretofore in certain instances by dechlorinating the water after it has become sterilized, but usually the corrosive action has been allowed to follow its natural course to avoid trouble and expense.

A still further objection to the use of chlorine for this purpose is the large amount required to effect complete sterilization of sewage or badly polluted water and this involves in some cases an almost prohibitive expense.

I have sought a way to effectively and economically avoid these and other objections to the use of chlorine and have succeeded in lessening and in some cases entirely overcoming the deleterious effects of the chlorine by bringing the chlorine in an aqueous solution into intimate contact with limestone in a more or less finely divided state before applying it for its intended purpose of sterilization.

When chlorinated water is thus brought into contact with limestone the following reactions occur.

(1) $2Cl_2 + 2HO_2 \rightleftarrows 2HCl + 2HOCl$

In other words

Chlorine + water→
←Hydrochloric acid + hypochlorous acid.

(2) $2HCl + 2HOCl + CaCo_3$ (in excess)→
$CaCl_2 + CO_2 + 2HOCl$, or

Hydrochloric acid + hypochlorous acid + limestone→calcium chloride + carbon dioxide gas + hypochlorous acid.

It will be particularly noted that under the conditions above set forth, hypochlorous acid does not react with the limestone.

A further reaction will occur between the carbon dioxide and the limestone if sufficient length of time be permitted for a reaction which at best is slow. This may be thus expressed—

$CO_2 + CaCO_3 + H_2O$ (in excess)→
$Ca(HCO_3)$ in solution, or in other words—

Carbon dioxide + limestone + water→
calcium bicarbonate.

The complete reaction, therefore, between chlorine water and limestone yields calcium chloride, calcium bicarbonate and hypochlorous acid but when this solution comes in contact with metals its corrosive action thereon is very slow or slight in comparison with that of chlorine water. When it is mixed with water or sewage it does not exert as marked a chlorinating action as does chlorine water but it reacts largely by oxidation, thus resulting in a saving in the amount of chlorine required in any given case. The reaction by oxidation may be thus expressed—

$$Ca(HCO_3)_2 + 2HOCl + \text{oxidizable material} \rightarrow CaCl_2 + 2CO_2 + 2HO_2 + \text{oxidized material}$$

or in other words—

Calcium bicarbonate + hypochlorous acid + oxidizable material → calcium chloride + carbon dioxide + water + oxidized material.

The resulting elements in this process are practically non-corrosive and the destructive hydrochloric acid that forms from chlorine water is completely neutralized.

In the practical carrying out of this invention I may follow several methods, but the principle of these is exemplified in either one of the two which may be thus generally described.

(1.) I pass a solution of chlorine and water upward through a chamber or tower containing crushed limestone and of sufficient dimensions to complete the reaction by the time the solution has passed through it, such time usually being from 15 minutes to one hour depending upon the temperature of the solution and the character of the limestone.

(2.) I bring chlorine water into intimate contact with powdered limestone, the latter preferably in suspension in a body of water. In this case the reaction is very rapid in releasing carbon dioxide ($CO_2$), but not so rapid in the reaction between the $CO_2$ and the limestone. This may result in the escape of some of the $CO_2$ and the consequent lack of dissolved lime sufficient to neutralize all of the hydrochloric acid eventually released in the subsequent reactions. This loss of $CO_2$ may be obviated, however, by the use of any device that permits sufficient contact between it and the powdered limestone, such as I have indicated in the annexed drawings.

In order to show clearly how this process is to be carried out I have added drawings illustrative of the manner in which the two above described methods are performed.

Figure 2:
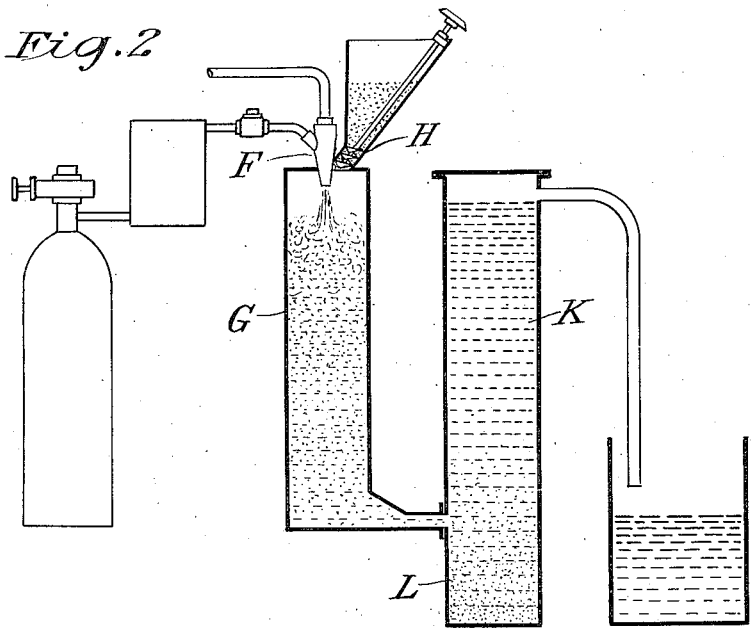

Fig. 1 is a partly diagrammatic illustration of the apparatus used in the first named method and Fig. 2 is a similar illustration of that used for the other.

Referring to Fig. 1, a container of chlorine A is connected through a meter B with a mixing and injector chamber C. The chlorine water from this latter is carried to the bottom of a chamber or tower D containing crushed limestone and the solution after passing through this tower is delivered to the water or sewage E that is to be sterilized.

Referring to Fig. 2, the chlorine after being metered is forced by an injector F into a mixing chamber G containing water and powdered limestone. The latter may be fed into the chamber by a worm screw H in regulable quantity. The action of the injector is to thoroughly agitate the solution and bring the chlorine into intimate contact with the powdered limestone. It also carries the bubbles of $CO_2$ out into a settling chamber K where it is exposed for a sufficient length of time to the limestone to produce the reaction which I have above set forth.

The settling chamber may be provided if found necessary or desirable with a sludge trap L but whether this be used or not the solution is carried from the settling chamber to the water or sewage which is to be sterilized by any proper means.

Manifestly the specific nature of the apparatus employed for carrying out this process is not of the essence of the invention and may be greatly modified.

What I claim is:

1. The process herein set forth of sterilizing water and sewage which consists in subjecting chlorine in water to intimate contact with limestone before applying the solution to the water or sewage to be sterilized.

2. The process herein set forth of sterilizing water and sewage which consists in passing a solution of chlorine and water through a body of crushed limestone and delivering the solution after passing through the limestone and its reaction therewith to the water or sewage to be sterilized.

3. The process herein set forth of sterilizing water or sewage which consists in bringing chlorine and water into intimate contact with finely divided limestone and allowing the solution after its reaction with the limestone sufficient time for the carbonic dioxide therein to react with the limestone and then delivering the solution to the water or sewage to be sterilized.

4. The process herein set forth of sterilizing water or sewage which consists in mixing chlorine and water keeping the solution in intimate contact with finely divided limestone until the resultant reactions are substantially complete and then supplying the solution to the water or sewage which is to be sterilized.

In testimony whereof I hereto affix my signature.

JOHN CLARK BAKER.